Dec. 15, 1925.

W. FRICK ET AL

RIM TOOL

Filed Feb. 21, 1924

Inventors:
William Frick
Frank Klima
By
Attorneys

Dec. 15, 1925.  1,565,357
W. FRICK ET AL
RIM TOOL
Filed Feb. 21, 1924  2 Sheets-Sheet 2

Inventors:
William Frick,
Frank Klima

Patented Dec. 15, 1925.

1,565,357

UNITED STATES PATENT OFFICE.

WILLIAM FRICK AND FRANK KLIMA, OF DETROIT, MICHIGAN.

RIM TOOL.

Application filed February 21, 1924. Serial No. 694,230.

*To all whom it may concern:*

Be it known that we, WILLIAM FRICK and FRANK KLIMA, citizens of the United States of America, residing at Detroit, in the county of Wayne and State of Michigan, have invented certain new and useful Improvements in Rim Tools, of which the following is a specification, reference being had therein to the accompanying drawings.

This invention relates to rim tools of that class employed for retracting and distending a split rim such as used on automobile wheels for supporting a tire.

The primary object of our invention is to provide a tool that may be easily and quickly mounted on a rim, which has been removed from a wheel, to shift the ends of the rim so that a tire on the rim may be removed, or the rim adjusted to firmly hold a tire placed about the rim, such operations being incident to substituting a new or mounted tire for an old or injured tire.

Another object of this invention is to provide a simple, durable and inexpensive tool that may be safely manipulated to retract or distend the ends of a split rim without any danger of the rim slipping or injuring an operator.

Other objects are attained by virtue of the novel construction which will be hereinafter described and then claimed, and reference will now be had to the drawings, wherein Figure 1 is a side elevation of the rim tool showing the manner of retracting the split ends of a rim;

Figure 1:
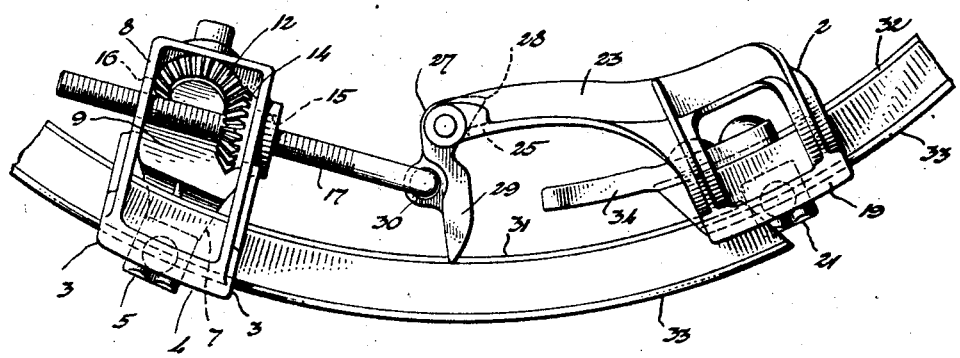
Figure 2:
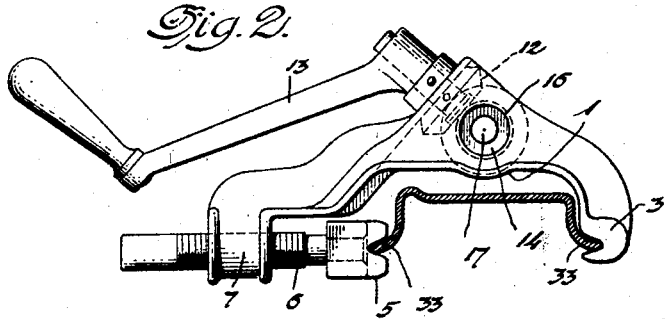
Fig. 2 is a view of one end of the tool.
Figure 3:
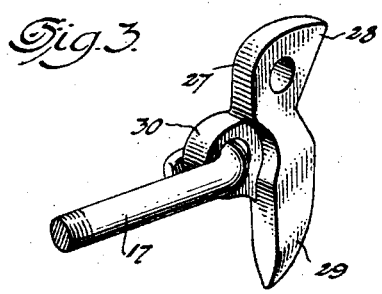
Fig. 3 is a perspective view of a connecting member.
Figure 4:
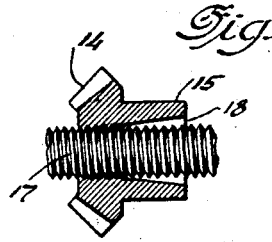
Fig. 4 is a detail view of a portion of the operating mechanism of the tool.

The tool comprises two articulated gripping members 1 and 2, the member 1 having a set of notched rim engaging jaws 3 connected by a web 4 and adapted to cooperate with the jaws 3 in gripping a rim is an adjustable notched rim engaging jaw 5 loosely mounted on the inner ends of a screw 6 in screwthreaded engagement with a single arm 7 carried by the member 1. The arm 7 and the jaws 3 are reinforced by webs 8 which are joined to form a housing 9 on the member 1, and journaled in an inclined wall 10 of said housing is a shaft 11 having its inner end provided with a beveled gear wheel 12 and its outer end with a detachable crank 13. The beveled gear wheel 12 meshes with a beveled gear wheel 14 forming part of a nut 15 rotatable in one of the side webs 8 of the housing having an opening 16 to provide clearance for the end of a screw rod 17 in threaded engagement with the nut 15. The nut 15 has a flared opening 18 providing clearance for the screw rod 17 which has a screwthreaded engagement with the nut permitting of slight wobbling movement of the screw rod in the nut should occasion require. The gripping member 2 is somewhat similar to the gripping member 1 in so much that it has a set of rim engaging jaws 19, an arm 20 and a single notched rim engaging jaw 21 adapted to be adjusted by a screw 22. In lieu of the housing 9 the gripping member 2 has a shank 23 in a plane at a right angle to the transverse plane of the gripping member 2. The outer end of the shank 23 is bifurcated to form apertured ears 24 and a stop shoulder 25. Pivotally mounted between the ears 24 by a pin 26 is a connecting member 27 having a short crank 28 to engage the stop shoulder 25 and a long crank 29 which may be retained at substantially a right angle to the shank 23 by the short crank 28 engaging the stop shoulder 25. The long crank 29 has an apertured lug 30 pivotally connected to the outer end of the screw rod 17.

Figure 5:
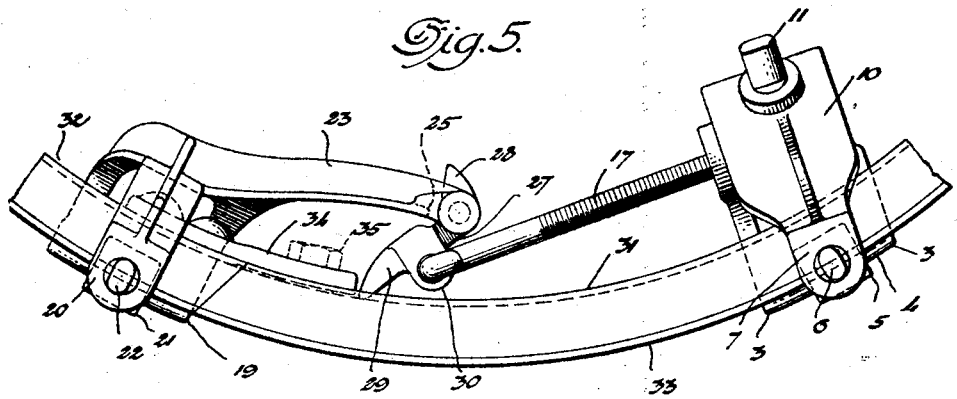
Fig. 5 is a side elevation of the tool showing the manner in which the split ends of a rim may be distended.
Figure 6:
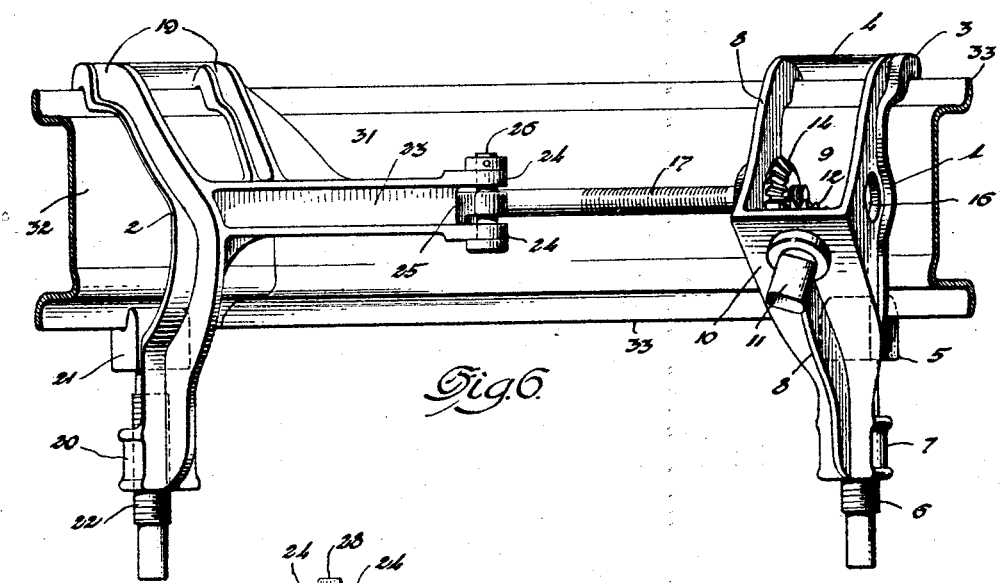
Fig. 6 is a plan of the same.
Figure 7:
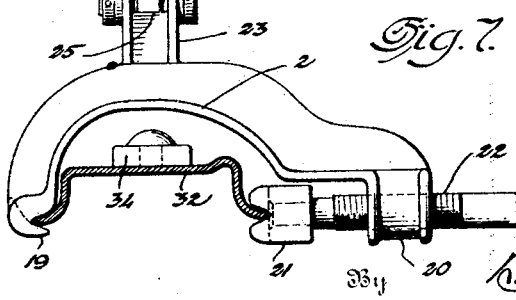
Fig. 7 is a view of another end of the tool.

The crank 13 may be placed on the outer end of either of the screws 6 or 22 to clamp the rim tool on a rim, and as illustrating the manner of using the rim tool, I show split ends 31 and 32 of a conventional form of rim, which has side flanges 33 that may be engaged by the jaws 3, 5, 19 and 21 to clamp the tool in position on the split ends of the rim for retracting or distending such split ends. As shown in Fig. 1, the split end 32 has been pulled inwardly by the tool and along the split end 31, such retraction of the rim being sufficient to permit of a tire being removed from the rim. To distend the split ends of the rim so that such split ends may be placed in abutting relation, as shown in Fig. 5, the connecting member 27 becomes a pushing instrumentality and abuts a connecting bar 34, on the split end 32 to push this end of the rim outwardly until it glides into abutting relation with the split end 31 of the rim. A screw bolt 35 or other holding device may be associated with the connecting bar 34 to positively hold the rim distended with a tire thereon.

One embodiment of our invention has been illustrated, but it is to be understood that the structural elements are susceptible to such variations and modifications as fall within the scope of the appended claim.

What we claim is:—

A rim adjusting tool comprising rim gripping members, a rigid shank carried by one of said members, housing carried by the other of said members, an adjustable screw rod extending through said housing, an operating shaft supported by said housing and extending at an angle to the horizontal plane of said housing, gears establishing a driving relation between said shaft and said screw rod, and a connecting member for said shank and screw rod so that said connecting member may serve for pushing or pulling said shank when said screw rod is adjusted.

In testimony whereof we affix our signatures.

WILLIAM FRICK.
FRANK KLIMA.